(12) United States Patent
Rozman et al.

(10) Patent No.: US 10,122,306 B2
(45) Date of Patent: *Nov. 6, 2018

(54) ELECTRIC POWER GENERATING SYSTEM WITH A PERMANENT MAGNET GENERATOR AND COMBINATION OF ACTIVE AND PASSIVE RECTIFIERS

(71) Applicant: Hamilton Sundstrand Corporation, Charlotte, NC (US)

(72) Inventors: Gregory I. Rozman, Rockford, IL (US); Steven J. Moss, Rockford, IL (US); Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,350

(22) Filed: Mar. 8, 2017

(65) Prior Publication Data

US 2018/0262137 A1    Sep. 13, 2018

(51) Int. Cl.
*H02P 9/00* (2006.01)
*H02P 103/20* (2016.01)

(52) U.S. Cl.
CPC ............ *H02P 9/00* (2013.01); *H02P 2103/20* (2015.01)

(58) Field of Classification Search
CPC ....................................................... H02P 9/00
See application file for complete search history.

(56) References Cited

U.S. PATENT DOCUMENTS

| | | | |
|---|---|---|---|
| 3,896,349 A | | 7/1975 | Lozenko |
| 4,649,337 A | * | 3/1987 | Stucker .................. H01F 21/06 |
| | | | 324/138 |
| 5,198,698 A | * | 3/1993 | Paul ......................... H02J 9/08 |
| | | | 307/46 |

(Continued)

FOREIGN PATENT DOCUMENTS

| | | |
|---|---|---|
| CN | 202395465 | 8/2012 |
| CN | 105656269 | 6/2016 |

(Continued)

OTHER PUBLICATIONS

U.S. Appl. No. 15/207,901, filed Jul. 12, 2016 and entitled Integrated Modular Electric Power System for a Vehicle.

(Continued)

*Primary Examiner* — Viet Nguyen
(74) *Attorney, Agent, or Firm* — Snell & Wilmer L.L.P.

(57) ABSTRACT

An electric power generating system (EPGS) may comprise a permanent magnet generator (PMG) comprising a rotor comprising a permanent magnet and a stator comprising a first armature winding configured to output a first three-phase voltage, and a second armature winding configured to output a second three-phase voltage. The EPGS may further comprise a passive rectifier configured to rectify the first three-phase voltage, an active rectifier configured to rectify the second three-phase voltage, and an active rectifier controller, wherein the active rectifier is controllable in response to a current reference received by the active rectifier controller. An EPGS may comprise a tunable notch filter configured to filter a first DC voltage and/or a DC output voltage, in accordance with various embodiments.

10 Claims, 8 Drawing Sheets

(56) References Cited

U.S. PATENT DOCUMENTS

| | | | |
|---|---|---|---|
| 5,318,142 A | 6/1994 | Bates | |
| 5,430,362 A | 7/1995 | Carr | |
| 5,642,021 A * | 6/1997 | Liang | H02P 9/48 318/146 |
| 6,101,102 A * | 8/2000 | Brand | H02M 1/12 257/E27.049 |
| 6,144,190 A * | 11/2000 | Scott | H02M 5/4585 322/25 |
| 6,456,946 B1 * | 9/2002 | O'Gorman | B62D 5/0487 702/58 |
| 6,873,134 B2 | 3/2005 | Canter | |
| 6,965,183 B2 | 11/2005 | Dooley | |
| 7,521,814 B2 | 4/2009 | Nasr | |
| 7,672,147 B1 | 3/2010 | Schutten | |
| 7,777,384 B2 | 8/2010 | Gieras | |
| 8,085,003 B2 | 12/2011 | Gieras | |
| 8,115,446 B2 | 2/2012 | Piccard | |
| 8,330,413 B2 | 12/2012 | Lazarovich | |
| 9,985,562 B1 * | 5/2018 | Rozman | H02P 9/34 |
| 2001/0054882 A1 * | 12/2001 | Nakamura | H02J 7/1492 322/28 |
| 2006/0087869 A1 * | 4/2006 | Weger | H02M 3/33561 363/26 |
| 2008/0164851 A1 * | 7/2008 | Ganev | H02M 7/493 322/8 |
| 2009/0009019 A1 | 1/2009 | Lihu et al. | |
| 2009/0085531 A1 * | 4/2009 | Ooiwa | H02P 9/48 322/24 |
| 2010/0244599 A1 | 9/2010 | Saban | |
| 2012/0098261 A1 | 4/2012 | Rozman | |
| 2012/0126758 A1 * | 5/2012 | Fang | H02P 9/48 322/29 |
| 2013/0320943 A1 | 12/2013 | Meehan | |
| 2014/0346897 A1 | 11/2014 | Nangemannjoerg | |
| 2014/0347898 A1 | 11/2014 | Raju et al. | |
| 2015/0016159 A1 * | 1/2015 | Deboy | H02J 3/383 363/71 |
| 2015/0061606 A1 * | 3/2015 | Pan | H02P 9/008 322/7 |
| 2015/0061607 A1 * | 3/2015 | Pan | H02P 25/22 322/27 |
| 2015/0236634 A1 | 8/2015 | Han | |
| 2015/0298627 A1 | 10/2015 | Nordlander | |
| 2015/0311719 A1 * | 10/2015 | Andresen | H02J 3/36 307/82 |

FOREIGN PATENT DOCUMENTS

| | | |
|---|---|---|
| EP | 2114001 | 11/2009 |
| EP | 2341608 | 7/2011 |
| EP | 2579437 | 4/2013 |
| FR | 2920260 | 2/2009 |
| GB | 828734 | 2/1960 |
| JP | 2007209199 | 8/2007 |
| WO | 2014157719 | 10/2014 |

OTHER PUBLICATIONS

U.S. Appl. No. 15/236,890, filed Aug. 15, 2016 and entitled Active Rectifier Topology.

U.S. Appl. No. 15/249,639, filed Aug. 29, 2016 and entitled Power Generating Systems Having Synchronous Generator Multiplex Windings and Multilevel Inverters.

U.S. Appl. No. 15/348,313, filed Nov. 10, 2016 and entitled High Voltage Direct Current System for a Vehicle.

U.S. Appl. No. 15/348,335, filed Nov. 10, 2016 and entitled Electric Power Generating System With a Syncrhonous Generator.

U.S. Appl. No. 15/397,354, filed Jan. 3, 2017 and entitled Electric Power Generating System With a Permanent Magnet Generator.

U.S. Appl. No. 15/453,383, filed Mar. 8, 2017 and entitled Electric Power Generating System With a Synchronous Generator and a Tunable Filter.

Xu, et al., "Reliability analysis and redundancy configuration of MMC with hybrid submodule topologies," IEEE Trans. Power Electron, vol. 31, No. 4, pp. 2720-2729, Apr. 2016.

Gupta, et al., "Multilevel inverter topologies with reduced device count: a review," IEEEE Trans. Power Electron, vol. 31, No. 1, pp. 135-151, Jan. 2016.

Soong, et al.., "Assessment of Fault Tolerance in Modular Multilevel Converters with Integrated Energy Storage," IEEE Trans. Power Electron., vol. 31, No. 6, pp. 4085-4095, Jun. 2016.

USPTO, Notice of Allowance dated Apr. 11, 2018 in U.S. Appl. No. 15/453,383.

European Patent Office, European Search Report dated Jul. 30, 2018 in Application No. 18160703.7-1202.

Balog R et al: "Automatic tuning of coupled inductor filters", Power Electronics Specialists Conference; [Annual Power Electronics Specialists Conference], vol. 2, Jun. 23, 2002 (Jun. 23, 2002), pp. 591-596.

Nishida Yet Al: "A new harmonic reducing three-phase diode rectifier for high voltage and high power applications", Industry Applications Conference, 1997. Thirty-Second IAS Annual Meeting, IAS 97., Conference Record of the 1997 IEEE New Orleans, LA, USA Oct. 5-9, 1997, New York, NY, USA IEEE, US, vol. 2, Oct. 5, 1997 (Oct. 5, 1997), pp. 1624-1632.

European Patent Office, European Search Report dated Mar. 14, 2018 in Application No. 17196186.5-1201.

European Patent Office, European Search Report dated Mar. 19, 2018 in Application No. 17200650.4-1202.

European Patent Office, European Search Report dated May 4, 2018 in Application No. 18150104.0-1202.

* cited by examiner

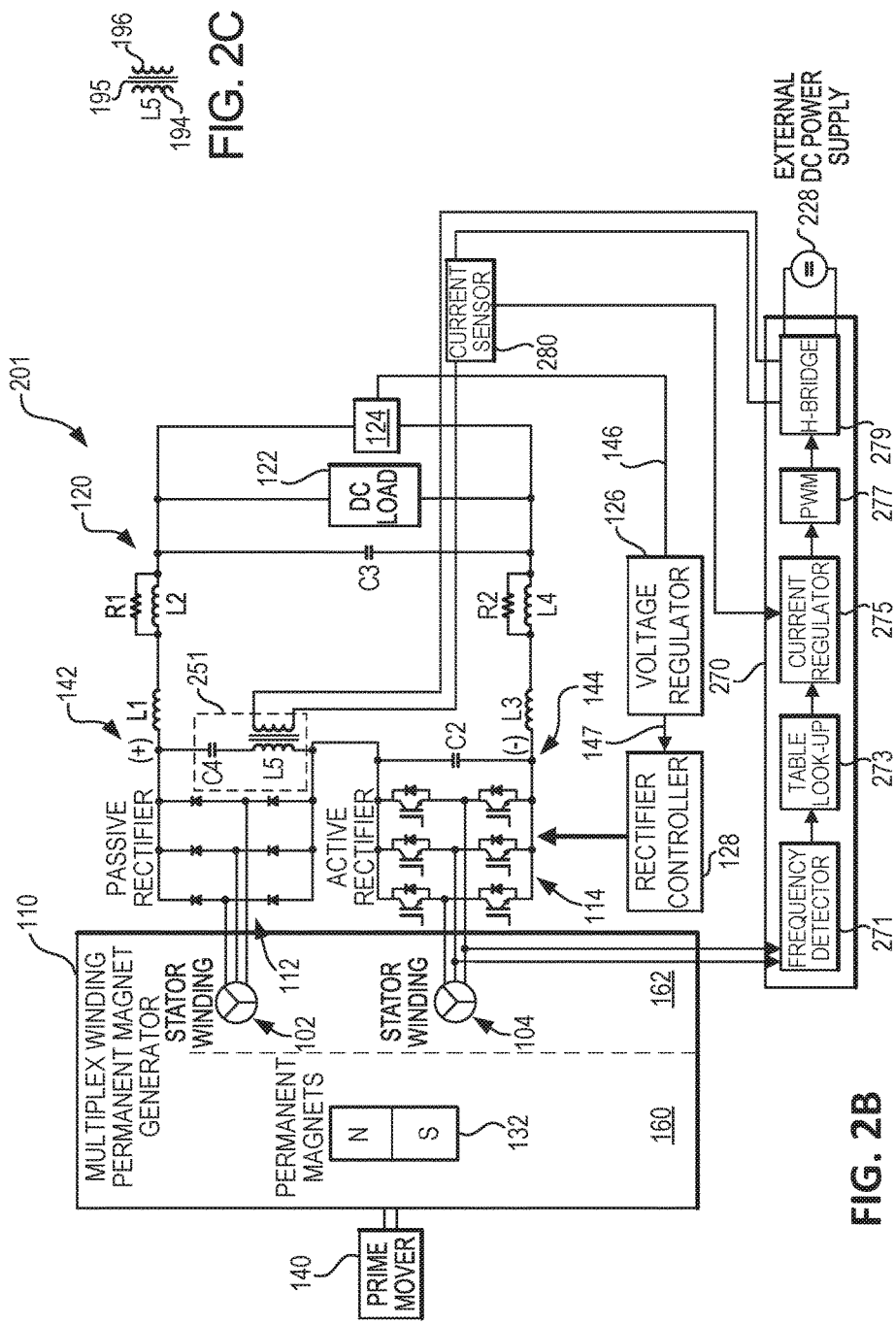

Primary winding of inductor L5

ELECTRIC POWER GENERATING SYSTEM WITH A PERMANENT MAGNET GENERATOR AND COMBINATION OF ACTIVE AND PASSIVE RECTIFIERS

FIELD

The disclosure generally relates to electrical power systems, and more particularly to the design of an electrical power generating system for a vehicle.

BACKGROUND

Ground vehicles, included those suitable for off road use, have migrated toward hybrid electric technology using high voltage direct current (HVDC) distribution. A permanent magnet generator (PMG) may be used to generate electric power for an electronic power system. A PMG typically includes a stator winding and a rotor with permanent magnets (PMs) to generate a single three-phase voltage. The three-phase voltage may be outputted to a rectifier for conversion to a DC voltage. Due to the nature of power processing during rectification, voltage ripple is typically present in the output voltage of the generator.

SUMMARY

In various embodiments, an electric power generating system (EPGS) is disclosed. An EPGS may comprise a permanent magnet generator (PMG) comprising a rotor comprising a permanent magnet, and a stator comprising a first armature winding configured to output a first three-phase voltage, and a second armature winding configured to output a second three-phase voltage. The EPGS may further comprise a passive rectifier configured to rectify the first three-phase voltage, an active rectifier configured to rectify the second three-phase voltage, and an active rectifier controller, wherein the active rectifier is controllable in response to a current reference signal received by the active rectifier controller.

In various embodiments, the active rectifier and the passive rectifier may be connected in series, wherein the passive rectifier is configured to output a first direct current (DC) voltage, and the active rectifier is configured to output a second DC voltage. The EPGS may further comprise an output filter configured to filter a DC output voltage comprising a sum of at least the first DC voltage and the second DC voltage. The EPGS may further comprise a voltage regulator configured to supply the current reference signal to the active rectifier controller, and a voltage sensor configured to be connected across a DC load, wherein the voltage regulator receives a sensor signal from the voltage sensor and sends the current reference signal in response to the sensor signal. A phase shift between the first three-phase voltage and the second three-phase voltage may comprise 60/n degrees, where n is a total number of armature windings. The output filter may comprise a first inductor, a second inductor, a third inductor, a fourth inductor, a first resistor, a second resistor, and at least one capacitor.

An EPGS is disclosed herein, in accordance with various embodiments. An EPGS may comprise a PMG comprising a rotor, a stator comprising, a first armature winding configured to output a first three-phase voltage, and a second armature winding configured to output a second three-phase voltage. The EPGS may further comprise a passive rectifier configured to rectify the first three-phase voltage received from the first armature winding, an active rectifier configured to rectify the second three-phase voltage received from the second armature winding, wherein the passive rectifier is configured to output a first direct current (DC) voltage and the active rectifier is configured to output a second DC voltage, and a tunable notch filter configured to filter at least one of the first DC voltage and the second DC voltage.

In various embodiments, the tunable notch filter may be tunable in response to a rotational velocity of the rotor. The tunable notch filter may comprise a capacitor, and a variable inductor. The EPGS may further comprise an auto-tuning notch filter control, comprising a frequency detector, a current regulator, a pulse width modulator, and an H-bridge, wherein the auto-tuning notch filter control detects a rotational frequency of the rotor and regulates a current through a secondary winding of the variable inductor winding. The tunable notch filter may be connected across the passive rectifier and configured to filter the first DC voltage. The tunable notch filter may be connected across both the passive rectifier and the active rectifier and configured to filter a DC output voltage comprising a sum of at least the first DC voltage and the second DC voltage. The secondary winding of the variable inductor may be configured to receive the current from a power supply via the H-bridge, and the auto-tuning notch filter control utilizes a table look-up to determine the current based upon the rotational frequency of the rotor. The variable inductor may be mechanically coupled to the stator. The EPGS may further comprise a current sensor connected in series with the secondary winding of the variable inductor winding and configured to send a current signal to the current regulator. The EPGS may further comprise a voltage sensor electrically configured to sense the DC output voltage, a voltage regulator in electronic communication with the voltage sensor and configured to receive a sensor signal from the voltage sensor, and an active rectifier controller configured to receive a current reference signal from the voltage regulator, wherein the active rectifier is controllable in response to the current reference signal received by the active rectifier controller. At least a portion of the variable inductor winding may be disposed within a plurality of slots of the stator.

A method for generating electric power is disclosed herein, in accordance with various embodiments. A method for generating electric power may comprise rotating a rotor of a permanent magnet generator, generating, via a first stator armature winding, a first three-phase voltage in response to the rotating, rectifying, via a passive rectifier, the first three-phase voltage into a first DC voltage, generating, via a second stator armature winding, a second three-phase voltage in response to the rotating, rectifying, via an active rectifier, the second three-phase voltage into a second DC voltage, and controlling, via an active rectifier controller, the active rectifier.

In various embodiments, the method may further comprise sending, by a voltage sensor, a sensor signal to a voltage regulator, and sending, by the voltage regulator a current reference signal to the active rectifier controller, wherein the controlling the active rectifier regulates the second DC voltage in response to the current reference signal. The method may further comprise filtering, via a tunable notch filter, the first DC voltage and/or a DC output voltage, wherein the tunable notch filter is tunable in response to a rotational frequency of the rotor.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2B illustrates a schematic view of an EPGS having a PMG with an active rectifier and a passive rectifier and also having a tunable notch filter connected across the passive rectifier, in accordance with various embodiments;

FIG. 2C illustrates a schematic view of a variable inductor comprising a primary winding, a ferromagnetic core, and a secondary control winding, in accordance with various embodiments;

DETAILED DESCRIPTION

Figure 1:
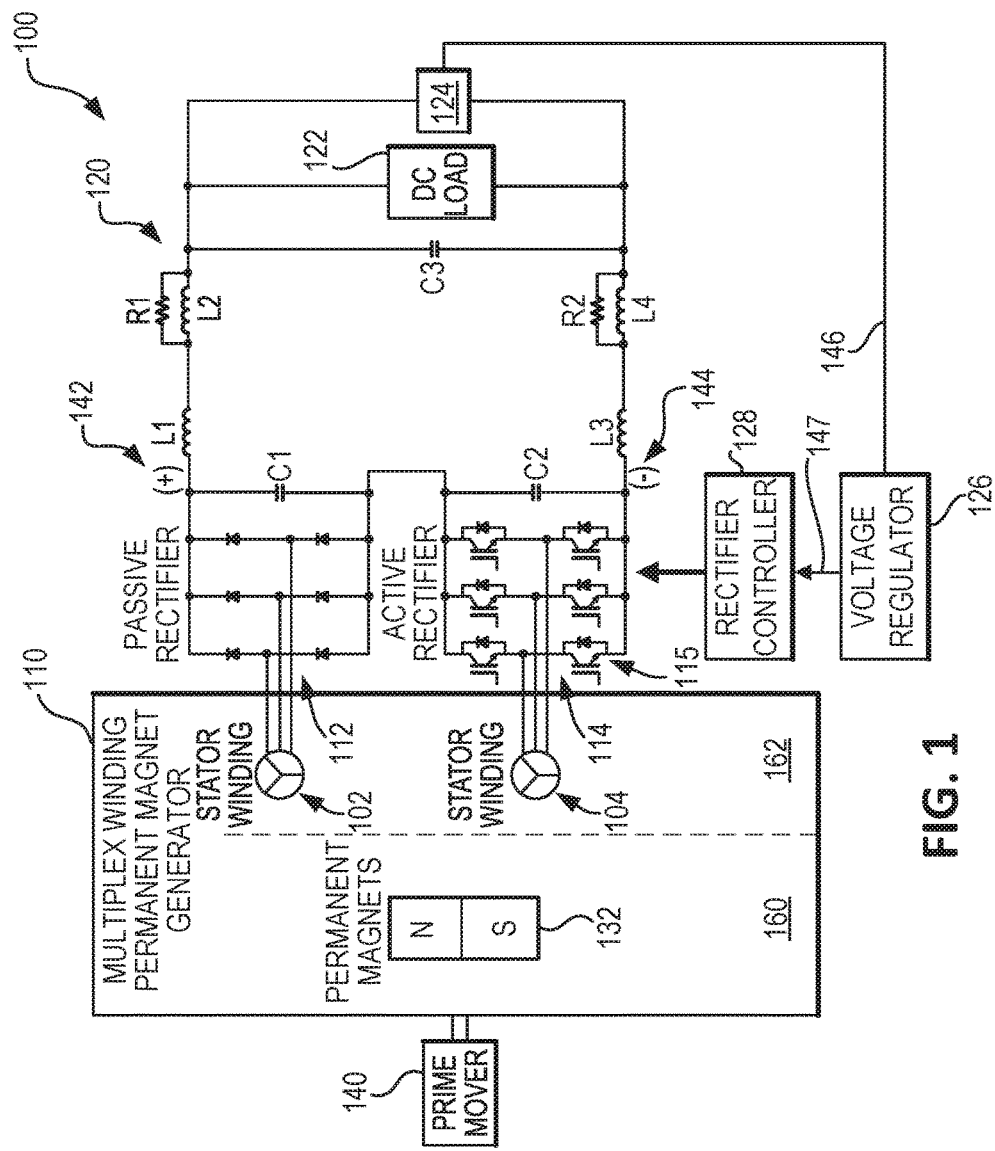
FIG. 1 illustrates a schematic view of an electric power generating system (EPGS) having a permanent magnet generator (PMG) with an active rectifier and a passive rectifier, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

In various embodiments, PMGs of the present disclosure make use of multiple stator armature windings disposed in a single stator or separate from the stator. A combination of active and passive rectifiers is electrically coupled to the PMG for respective stator armature windings. As a result, a plurality of outputs is connected in series to generate an HVDC output. One or more tunable notch filters may be electronically coupled across one or more rectifiers. A tunable notch filter may comprise a capacitor in series with a primary winding of a variable inductor. The variable inductor may comprise the primary winding, a partially saturated core, and a secondary winding. The ferromagnetic core of the variable inductor may be partially saturated by a DC current via the secondary winding. The secondary winding may be controllable via an auto-tuning notch filter control. The auto-tuning notch filter control may be tuned in response to a frequency of the PMG, (e.g., a rotational frequency of a rotor). The tunable notch filters may mitigate voltage ripple of the HVDC output.

In this regard, EPGSs of the present disclosure may result in improved packaging by reducing the size of power devices included in the rectifiers, due to their decreased voltage rating. EPGSs of the present disclosure may have significant reduction in weight of passive components, such as DC link capacitors, due to the decreased size of the DC link capacitors. EPGSs of the present disclosure may generate a DC output voltage having reduced DC bus voltage ripple with low DC bus capacitance. EPGSs of the present disclosure may tend to minimize use of active power switches and associated control apparatus. EPGSs of the present disclosure may enable redundancy, fault tolerance, use of low voltage power devices and capacitors, and/or use of high temperature DC link capacitors.

Unlike other generators, the output voltage of a PMG is directly proportional to the rotational velocity of the rotor. Therefore, an active rectifier may be configured to control an output voltage of the EPGS to a desired value.

With reference to FIG. 1, a schematic view of an electric power generating system (EPGS) 100 is illustrated, in accordance with various embodiments. EPGS 100 may include a permanent magnet generator (PMG) 110 and an output filter 120. PMG 110 may include a rotor 160 and a stator 162. Rotor 160 may be driven by a prime mover 140. In various embodiments, prime mover 140 may comprise an engine, such as a diesel engine for example. But, prime mover 140 may comprise any mover suitable for rotating rotor 160. PMG 110 may generate electric power in response to rotation of rotor 160. This electric power may pass through output filter 120. Output filter 120 may be in electronic communication with PMG 110. In various embodiments, PMG 110 may comprise a multiplex winding PMG.

In various embodiments, rotor 160 may comprise permanent magnets 132. Permanent magnets 132 may comprise a north pole N and a south pole S. Stator 162 may include a plurality of three-phase stator armature windings. These stator armature windings may include a first armature winding 102 and a second armature winding 104. Although the illustrated embodiment depicts two armature windings, it is contemplated herein that stator 162 may include any number of armature windings, such as three, four, or more armature windings. In various embodiments, during normal operation of PMG 110, rotor 160 is turned by an external device (e.g., prime mover 140) producing a rotating magnetic field, which induces a three-phase voltage within each of the stator windings. First armature winding 102 may be configured to output a first three-phase voltage in response to the rotation of rotor 160. Second armature winding 104 may be configured to output a second three-phase voltage in response to the rotation of rotor 160.

The number of three-phase armature winding sets (i.e., first armature winding 102, second armature winding 104, etc.) may include any number n of stator armature windings, such as two or more armature windings. The phase shift between armature windings may be 60/n. Thus, in the illustrated embodiment of FIG. 1, the phase shift between armature windings is 60/2, or 30. This phase shift may be achieved by distribution of windings in slots of the stator. This feature enables reduction of the voltage ripple at the DC bus (i.e., across positive terminal 142 and negative terminal 144) and reduction of the size of DC output filter 120 as well as rectifier capacitors C1 and C2.

EPGS 100 may include a plurality of rectifiers, such as passive rectifier 112 and active rectifier 114. Passive rectifier 112 may rectify the first three-phase voltage. Stated another way, the passive rectifier 112 may convert the first three-phase voltage from a three-phase voltage to a direct current (DC) voltage. Passive rectifier 112 may comprise a passive rectifier. Active rectifier 114 may rectify the second three-phase voltage. Active rectifier 114 may comprise a two-level six-switch PWM bidirectional boost rectifier. The PMG stator winding inductors may function as active rectifier boost inductors. The active rectifier controller 128 may commutate active rectifier power transistors in synchronization with the rotor 160 position. The rotor 160 position may be obtained by use of resolver, Hall effect position sensor, sense coils or by use of sensorless algorithms. The rotor position detection system is omitted in FIG. 1, FIG. 2A, and FIG. 2B for clarity.

In various embodiments, active rectifier 114 may comprise a plurality of transistors and diodes, such as six transistors and six diodes for example. Said transistors of active rectifier 114 may comprise insulated-gate bipolar transistors (IGBTs) and/or metal-oxide semiconductor field-effect transistors (MOSFETs). For example, active rectifier 114 may include transistor/diode pair 115. Passive rectifier 112 and active rectifier 114 may be located externally from the PMG 110. Therefore, PMG 110 may output a plurality of three-phase voltages, which may be rectified by the rectifiers. Passive rectifier 112 and active rectifier 114 may be connected in series.

The passive rectifier 112 may output the first rectified voltage, now a first DC voltage. A first rectifier capacitor C1 may be connected across passive rectifier 112. A second rectifier capacitor C2 may be connected across active rectifier 114. First rectifier capacitor C1 and second rectifier capacitor C2 may be connected in series. Stated another way, the plurality of rectifier capacitors (i.e., first rectifier capacitor C1 and second rectifier capacitor C2 in the exemplary embodiment of FIG. 1) may be connected in series. In this regard, a DC output voltage comprising the sum of the voltages of the first DC voltage and the second DC voltage is passed to output filter 120. It should be appreciated that the DC output voltage (i.e., the voltage across positive terminal 142 and negative terminal 144) may equal the sum of the voltages across each of the rectifier filters C1 and C2. The voltage rating, and thus the physical size, of the transistors and diodes in rectifiers 112 and 114 are reduced relative to the DC output voltage because said transistors only handle a portion of said voltage, and in this case approximately one half of said DC output voltage. Similarly, the voltage rating and physical size of capacitors C1 and C2 are considerably reduced. Moreover, the size of the output filter 120 is considerably reduced because the voltage ripple is reduced.

Output filter 120 may comprise inductor L1, inductor L2, inductor, L3, inductor L4, resistor R1, resistor R2, and filter capacitor C3. Inductor L1 may be connected in series with positive terminal 142 and connected in series with resistor R1 and inductor L2. Resistor R1 and inductor L2 may be connected in parallel. Inductor L3 may be connected in series with negative terminal 144 and connected in series with resistor R2 and inductor L4. Resistor R2 and inductor L4 may be connected in parallel. Filter capacitor C3 may be connected in parallel with the DC load 122. Output filter 120 may improve the quality of the DC output voltage.

A DC load 122 may receive the filtered DC output voltage. In various embodiments, DC load 122 may comprise a high voltage load. For example, DC load 122 may receive a DC output voltage of six hundred volts (600 V).

A voltage sensor 124 may be connected across DC load 122. Voltage regulator 126 may receive a sensor signal 146 from voltage sensor 124 for regulation of the voltage across DC load 122 via active rectifier 114. The sensor signal 146 may comprise the voltage across DC load 122. In various embodiments, voltage regulator 126 may provide a current reference signal 147 to an active rectifier controller 128. Active rectifier controller 128 may control active rectifier 114 to regulate the output voltage across DC load 122. For example, active rectifier controller 128 may control each transistor of active rectifier 114, such as transistor/diode pair 115 for example. Active rectifier controller 128 may utilize current reference signal 147 to maintain the output DC bus voltage at a specified level. For example, if a DC voltage of 600 Volts across DC load 122 is desired and the voltage across capacitor C1 is 200 Volts, then active rectifier controller 128 may regulate active rectifier 114 such that the voltage across capacitor C2 is 400 Volts to generate the desired 600 Volts.

In various embodiments, active rectifier 114 may comprise a bidirectional active rectifier, which may allow engine start from a vehicle battery or other external or internal power sources. Active rectifier 114 may comprise two-level, six-switch pulse width modulated (PWM) bidirectional boost active rectifiers. Active rectifier 114 may comprise a unidirectional boost three-level Vienna active rectifier.

Figure 2A:
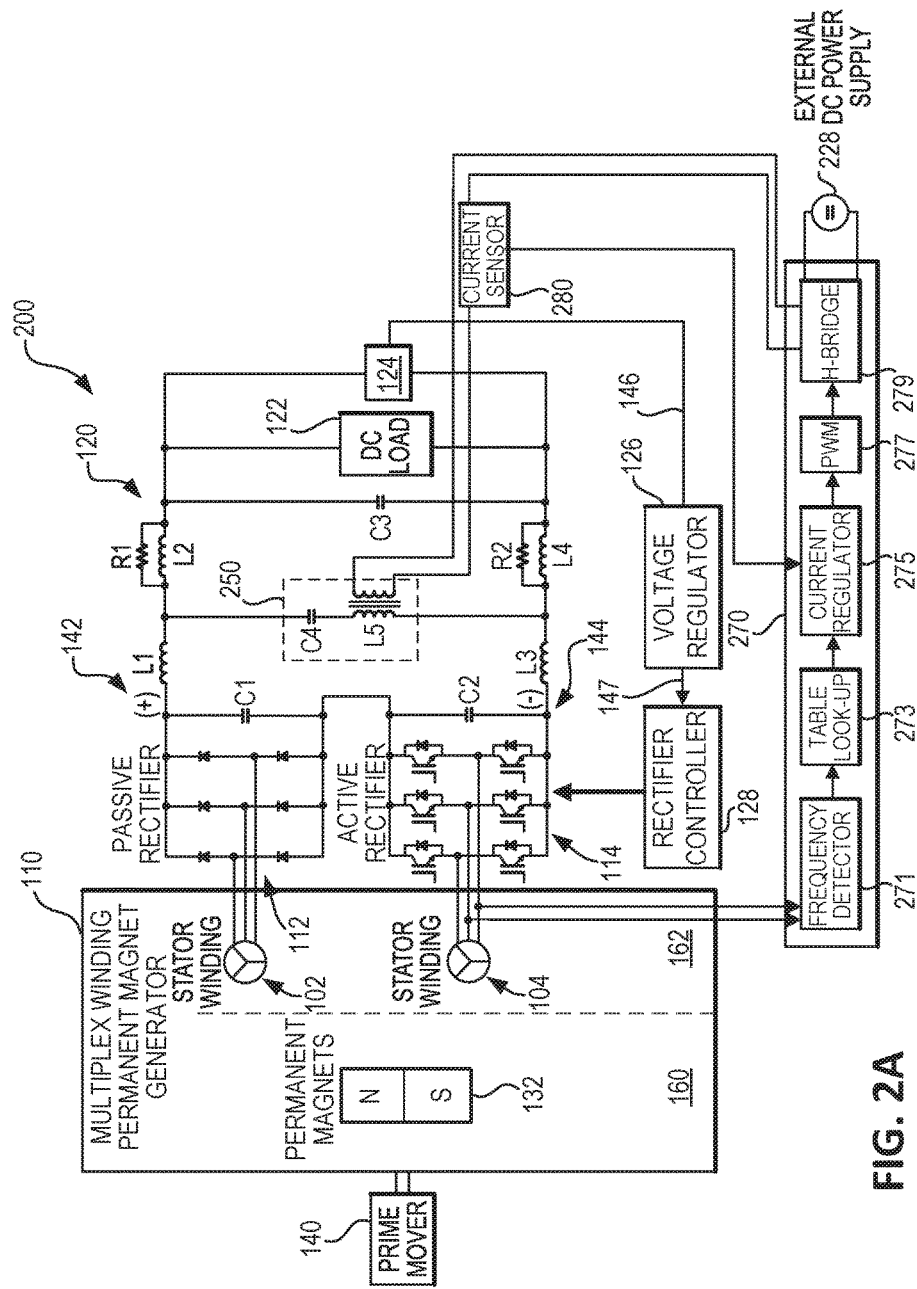
FIG. 2A illustrates a schematic view of an EPGS having a PMG with an active rectifier and a passive rectifier and also having a tunable notch filter connected across both rectifiers, in accordance with various embodiments.

With reference to FIG. 2A, a schematic view of an EPGS 200 is illustrated, in accordance with various embodiments. EPGS 200 may be similar to EPGS 100 of FIG. 1, except that EPGS 200 further includes a tunable notch filter 250, along with the associated auto-tuning notch filter control 270. In this regard, with respect to FIG. 2A and FIG. 2B, elements with like element numbering, as depicted in FIG. 1, are intended to be the same and will not necessarily be repeated for the sake of clarity.

A tunable notch filter 250 may be connected across passive rectifier 112 and active rectifier 114. Tunable notch filter 250 may comprise a capacitor C4 and a variable inductor (also referred to herein as a first variable inductor) L5. With momentary reference to FIG. 2C, an isolated view of variable inductor L5 is illustrated. It should be appreciated, that the variable inductor L5 may comprise a primary winding 194, a ferromagnetic core 195, and a secondary winding (also referred to herein as a control winding) 196. As should be appreciated, the DC current in the secondary winding partially saturates the ferromagnetic core resulting in controlling the inductance in the primary winding. In various embodiments, tunable notch filter 250 may be connected between inductor L1 and inductor L2 and between inductor L3 and inductor L4.

The DC output voltage, comprising the sum of the voltages of the first DC voltage and the second DC voltage, may be passed to tunable notch filter 250. Tunable notch filter 250 may reduce or eliminate voltage ripple in the DC output voltage.

EPGS 200 may comprise an auto-tuning notch filter control 270. Auto-tuning notch filter control 270 may comprise a frequency detector 271, a table look-up 273, a current regulator 275, a pulse width modulator (PWM) 277, and an asymmetric H-bridge 279. Frequency detector 271 may detect a rotational frequency of the rotor and regulate a current through variable inductor L5. Auto-tuning notch filter control 270 may comprise a current sensor 280. Current sensor 280 may be connected in series with the secondary winding of variable inductor L5. Current sensor 280 may be configured to send a current signal to the current regulator 275 indicative of the current through the secondary winding of variable inductor L5.

Frequency detector 271 may detect a frequency of the voltage output from armature winding 104. Table look-up 273 may utilize stored data to determine an optimal current to send to variable inductor L5 in response to the detected frequency. A current regulator 275 may determine a current through variable inductor L5, via current sensor 280, to provide an input to PWM 277. PWM 277 may control asymmetric H-bridge 279. Asymmetric H-bridge 279 may control the current flowing from external DC power supply 228 through the secondary winding of variable inductor L5. In this regard, auto-tuning notch filter control 270 is auto-tunable in response to the rotational velocity of rotor 160.

With reference to FIG. 2B, a schematic view of an EPGS 201 is illustrated, in accordance with various embodiments. EPGS 201 may be similar to EPGS 200 of FIG. 2A, except that EPGS 200 the tunable notch filter 251 is coupled across passive rectifier 112 instead of across both passive rectifier 112 and active rectifier 114. In this regard, tunable notch filter 251 may filter the first DC voltage. Tunable notch filter 251 may mitigate voltage ripple in the first DC voltage.

Figure 3:
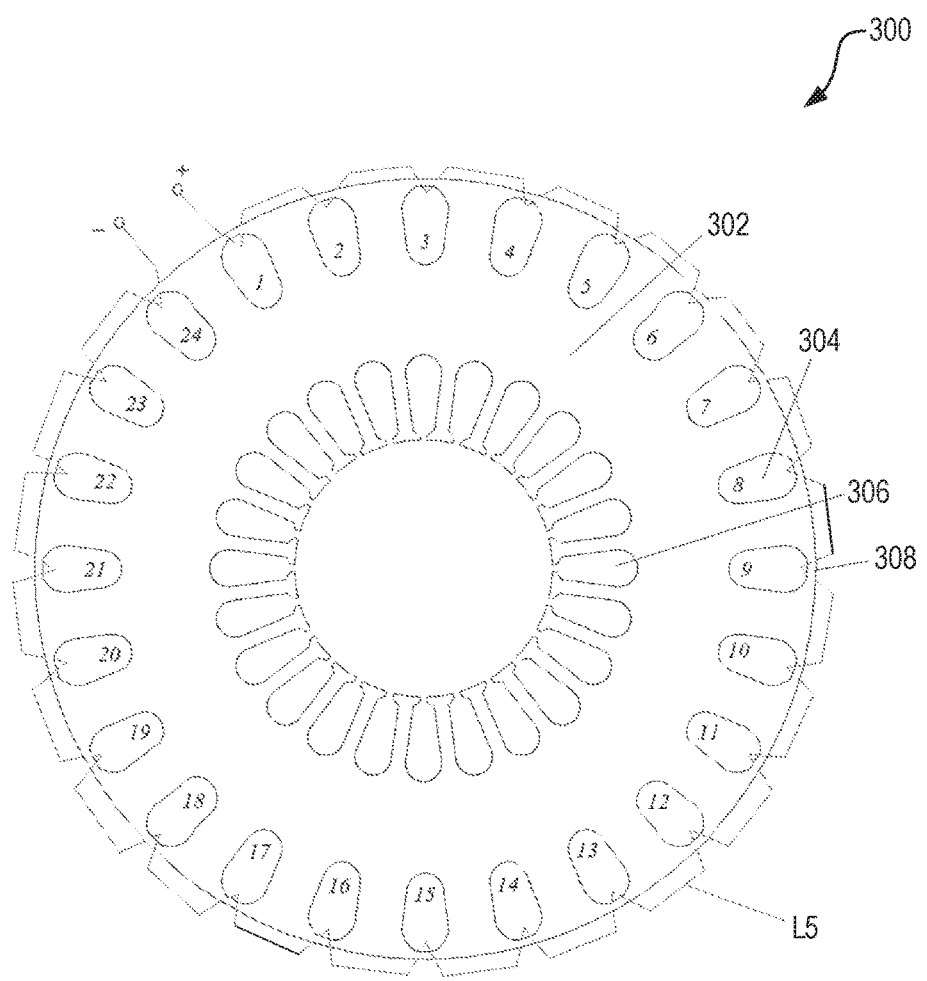
FIG. 3 illustrates a schematic view of a stator for a PMG and a secondary winding of a variable inductor of a tunable notch filter coupled to radially outer closed slots of the stator, in accordance with various embodiments.

In various embodiments, variable inductor L5 may be located externally from PMG 110. However, it is contemplated herein that variable inductor L5 may be located internally to PMG 110. In this regard, with reference to FIG. 3, a stator 300 for a PMG is illustrated, in accordance with various embodiments. In various embodiments, stator 162 of FIG. 1 may be similar to stator 300. In various embodiments, stator 300 may comprise a ferromagnetic core 302. Stator 300 may comprise a plurality of closed slots 304. Plurality of closed slots 304 may comprise radially outer slots, relative to the centerline axis of stator 300. Windings of variable inductor L5 may be disposed within plurality of closed slots 304. FIG. 3 illustrates the secondary winding of variable inductor winding L5. The primary winding of variable inductor L5 is omitted in FIG. 3 for clarity purposes. Stator 300 may comprise a plurality of semi-open slots 306. Armature windings (e.g., armature winding 102 and/or armature winding 104) may be disposed in plurality of semi-open slots 306. Stator 300 may comprise a plurality of ferromagnetic bridges 308. Ferromagnetic bridges 308 may enclose the plurality of closed slots 304. Windings of variable inductor L5 may be wrapped around plurality of ferromagnetic bridges 308. Stator 300 is illustrated as having 24 closed slots 304. However, stator 300 may have any number of closed slots 304.

Figure 4:
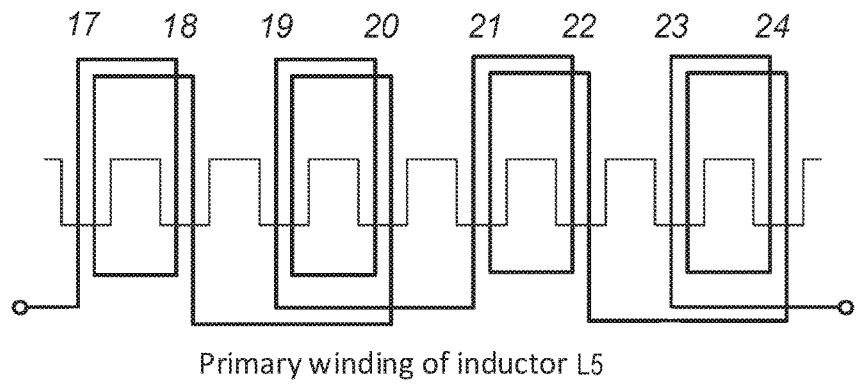
FIG. 4 illustrates a wire diagram of a primary winding of a variable inductor of a tunable notch filter, in accordance with various embodiments.

With reference to FIG. 4, a wiring diagram of the primary windings of variable inductor L5 is illustrated, in accordance with various embodiments. The numbers 17, 18, 19, etc. correspond to the closed slots 204 of FIG. 3 and the closed slots 504 of FIG. 5. Although FIG. 4 only illustrates closed slots 17 through 24, the primary winding may be similarly coupled to closed slots 1 through 16.

Figure 5:
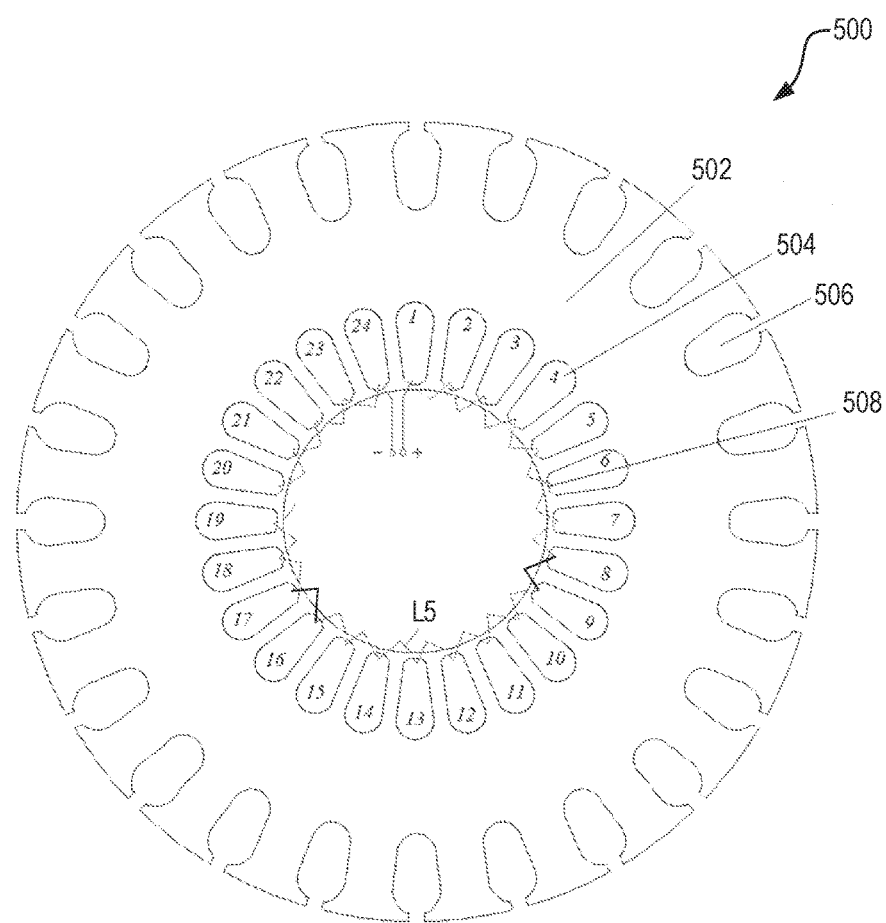
FIG. 5 illustrates a schematic view of a stator for a PMG and a secondary winding of a variable inductor of a tunable notch filter coupled to radially inner closed slots of the stator, in accordance with various embodiments.

With reference to FIG. 5, a stator 500 for a synchronous generator is illustrated, in accordance with various embodiments. In various embodiments, stator 162 of FIG. 1 may be similar to stator 500. In various embodiments, stator 500 may comprise a ferromagnetic core 502. Stator 500 may comprise a plurality of closed slots 504. Plurality of closed slots 504 may comprise radially inner slots, relative to the centerline axis of stator 500. Windings of variable inductor L5 may be disposed within plurality of closed slots 504. FIG. 5 illustrates the secondary windings of variable inductor L5. The primary windings of variable inductor L5 are omitted in FIG. 5 for clarity purposes. Stator 500 may comprise a plurality of semi-open slots 506. Armature windings (e.g., armature winding 102 and/or armature winding 104) may be disposed in plurality of semi-open slots 506. Stator 500 may comprise a plurality of ferromagnetic bridges 508. Ferromagnetic bridges 508 may enclose the plurality of closed slots 504. Winding of variable inductor L5 may be wrapped around plurality of ferromagnetic bridges 508.

Figure 6A:
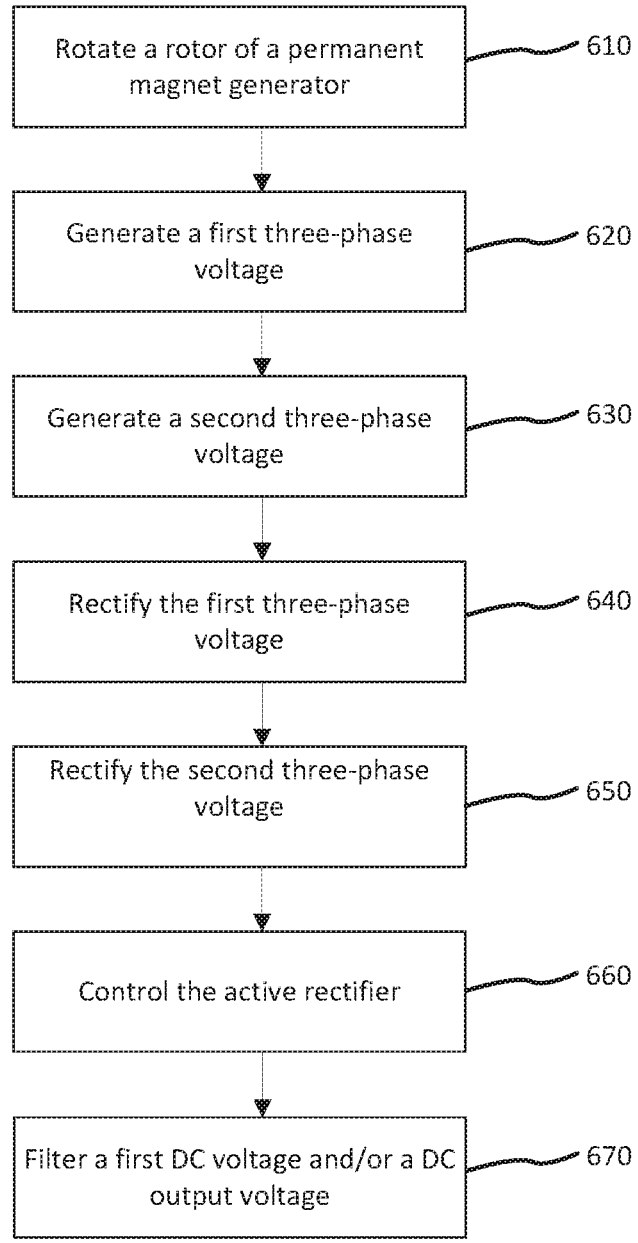
FIGS. 6A, 6B, and 7 illustrate methods for generating electric power, in accordance with various embodiments.
Figure 6B:
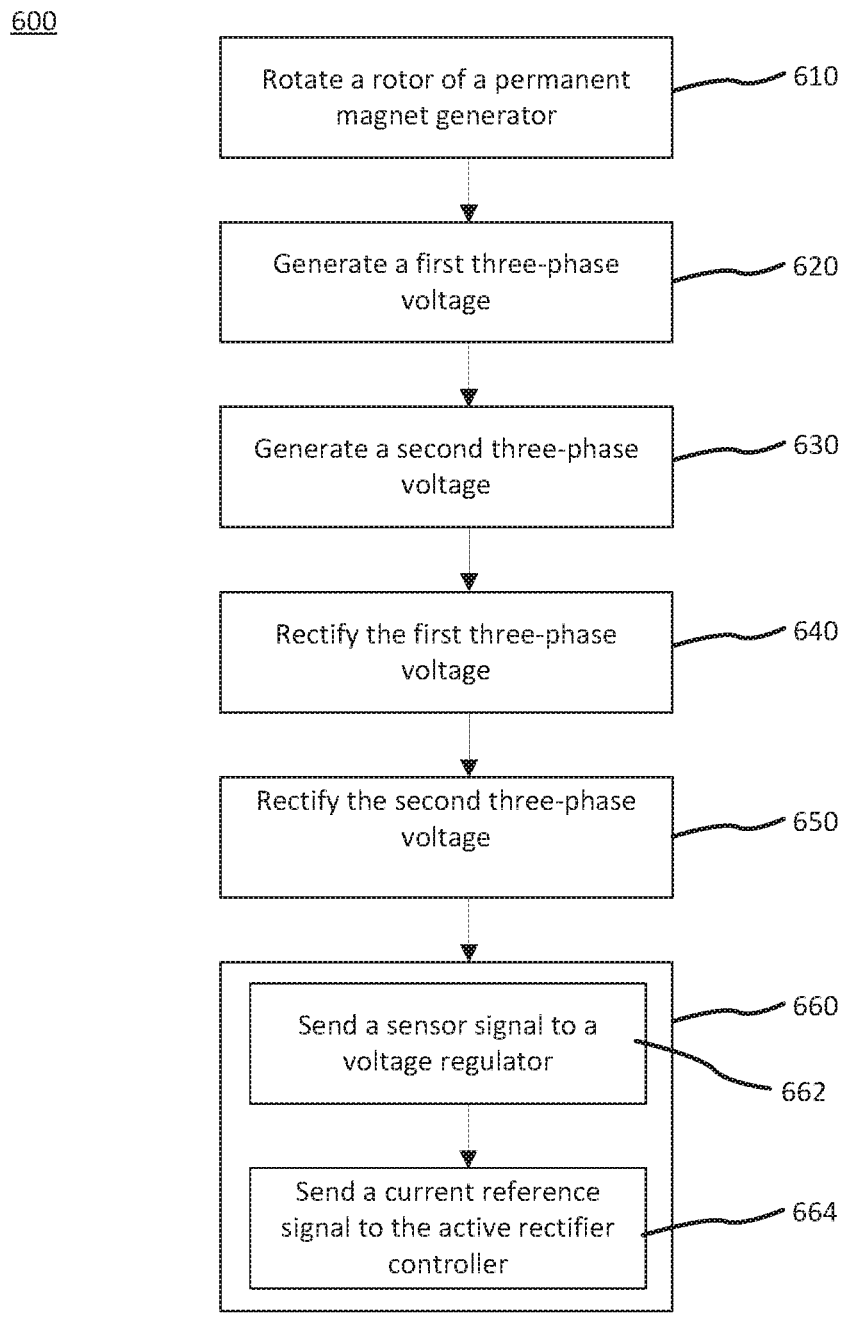

With combined reference to FIG. 6A and FIG. 6B, a method 600 for generating electric power is illustrated, in accordance with various embodiments. Method 600 includes rotating a rotor of a permanent magnet generator (step 610). Method 600 includes generating a first three-phase voltage (step 620). Method 600 includes generating a second three-phase voltage (step 630). Method 600 includes rectifying the first three-phase voltage (step 640). Method 600 includes rectifying the second three-phase voltage (step 650). Method 600 includes controlling the active rectifier (step 660).

Method 600 may further include sending a sensor signal to a voltage regulator (sub-step 662). Method 600 may further include sending a current reference signal to the active rectifier controller (sub-step 664). Method 600 includes filtering a first DC voltage and/or a DC output voltage (step 670).

Figure 7:
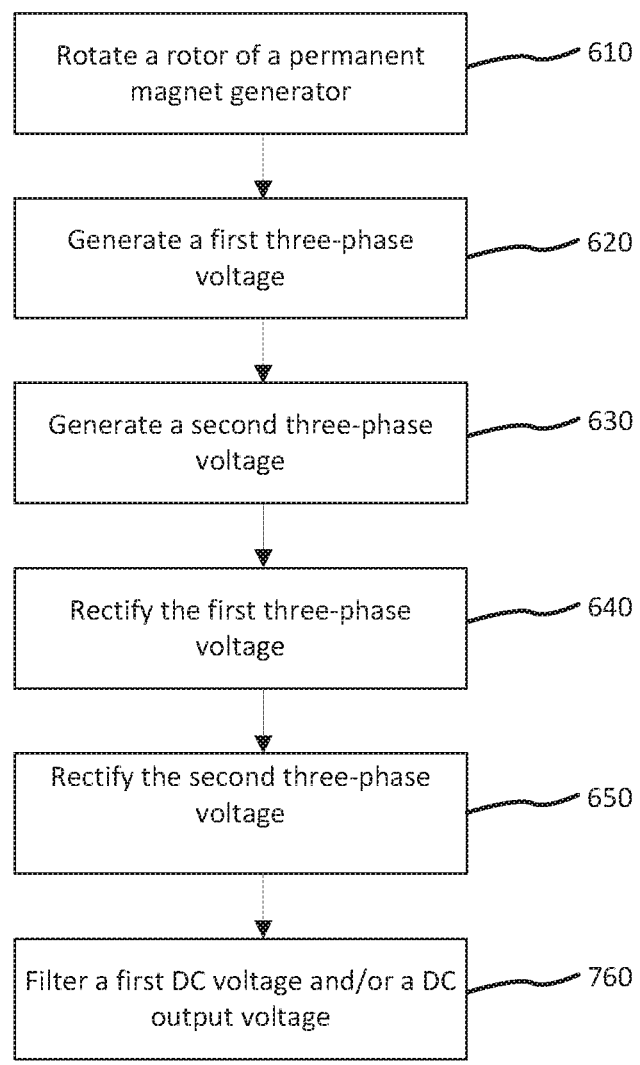

With combined reference to FIG. 7, a method 700 for generating electric power is illustrated, in accordance with various embodiments. Steps 610 through step 650 of method 700 may be similar to steps 610 through step 650 of method 600 of FIG. 6A. Method 700 further includes filtering a first DC voltage and/or a DC output voltage (step 760).

With combined reference to FIG. 1 through FIG. 2B and FIG. 6A through FIG. 7, step 610 may include rotating rotor 160 of PMG 110. Step 620 may include generating, via first armature winding 102, a first three-phase voltage in response to the rotation. Step 630 may include generating, via second armature winding 104, a second three-phase voltage in response to the rotation. Step 640 may include rectifying, via passive rectifier 112, the first three-phase voltage into a first DC voltage. Step 650 may include rectifying, via active rectifier 114, the second three-phase voltage into a second DC voltage. Step 660 may include controlling, via active rectifier controller 128, active rectifier 114. Sub-step 662 may include sending, by voltage sensor 124, sensor signal 146 to voltage regulator 126. Sub-step 664 may include sending, by voltage regulator 126, current reference signal 147 to active rectifier controller 128. The controlling the active rectifier 114 may regulate the second DC voltage in response to the current reference signal 147. Step 670 may include filtering, via tunable notch filter 250, the DC output voltage. Step 670 may include filtering, via tunable notch filter 251, the first DC voltage. Step 760 may include filtering, via tunable notch filter 250, the DC output voltage. Step 760 may include filtering, via tunable notch filter 251, the first DC voltage.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric power generating system (EPGS) comprising,
   a permanent magnet generator (PMG) comprising:
      a rotor;
      a stator comprising:
         a first armature winding configured to output a first three-phase voltage; and
         a second armature winding configured to output a second three-phase voltage;
   a passive rectifier configured to rectify the first three-phase voltage received from the first armature winding;
   an active rectifier configured to rectify the second three-phase voltage received from the second armature winding,
   wherein the passive rectifier is configured to output a first direct current (DC) voltage and the active rectifier is configured to output a second DC voltage; and
   a tunable notch filter comprising a capacitor and a variable inductor, the tunable notch filter configured to filter at least one of the first DC voltage and the second DC voltage, the tunable notch filter tunable in response to a rotational velocity of the rotor; and
   an auto-tuning notch filter control, comprising:
      a frequency detector;
      a current regulator;
      a pulse width modulator; and
      an H-bridge,
   wherein the auto-tuning notch filter control detects a rotational frequency of the rotor and regulates a current through a secondary winding of the variable inductor.

2. The EPGS of claim 1, wherein the tunable notch filter is connected across the passive rectifier and configured to filter the first DC voltage.

3. The EPGS of claim 1, wherein the tunable notch filter is connected across both the passive rectifier and the active rectifier and configured to filter a DC output voltage comprising a sum of at least the first DC voltage and the second DC voltage.

4. The EPGS of claim 3, further comprising:
   a voltage sensor electrically configured to sense the DC output voltage;
   a voltage regulator in electronic communication with the voltage sensor and configured to receive a sensor signal from the voltage sensor; and
   an active rectifier controller configured to receive a current reference signal from the voltage regulator,
   wherein the active rectifier is controllable in response to the current reference signal received by the active rectifier controller.

5. The EPGS of claim 1, wherein
   the secondary winding of the variable inductor is configured to receive the current from a power supply via the H-bridge; and
   the auto-tuning notch filter control utilizes a table look-up to determine the current based upon the rotational frequency of the rotor.

6. The EPGS of claim 1, wherein the variable inductor is mechanically coupled to the stator.

7. The EPGS of claim 6, wherein at least a portion of the variable inductor is disposed within a plurality of slots of the stator.

8. The EPGS of claim 1, further comprising a current sensor connected in series with the secondary winding of the variable inductor and configured to send a current signal to the current regulator.

9. A method for generating electric power, comprising:
rotating a rotor of a permanent magnet generator;
generating, via a first stator armature winding, a first three-phase voltage in response to the rotating;
rectifying, via a passive rectifier, the first three-phase voltage into a first DC voltage;
generating, via a second stator armature winding, a second three-phase voltage in response to the rotating;
rectifying, via an active rectifier, the second three-phase voltage into a second DC voltage;
controlling, via an active rectifier controller, the active rectifier;
filtering, via a tunable notch filter, at least one of the first DC voltage and the second DC voltage, the tunable notch filter comprising a variable inductor and a capacitor;
detecting, via an autonomous notch filter control, a rotational frequency of the rotor, wherein the tunable notch filter is tunable in response to a rotational frequency of the rotor; and
regulating, by the autonomous notch filter control, a current through a secondary winding of the variable inductor,
wherein the auto-tuning notch filter control comprises: a frequency detector; a current regulator; a pulse width modulator; and an H-bridge.

10. The method of claim 9, further comprising:
sending, by a voltage sensor, a sensor signal to a voltage regulator; and
sending, by the voltage regulator a current reference signal to the active rectifier controller,
wherein the controlling the active rectifier regulates the second DC voltage in response to the current reference signal.

* * * * *